US012783288B2

(12) United States Patent
Hundt et al.

(10) Patent No.: US 12,783,288 B2

(45) Date of Patent: Nov. 3, 2026

(54) COMPOSABLE FULLY AUTONOMOUS PROCESSING

(71) Applicant: American Express Travel Related Services Company, Inc., New York, NY (US)

(72) Inventors: Timothy Hundt, Phoenix, AZ (US); Prasanna Talakanti, Lansing, MI (US)

(73) Assignee: American Express Travel Related Services Company, Inc., New York, NY (US)

( * ) Notice: Subject to any disclaimer, the term of this patent is extended or adjusted under 35 U.S.C. 154(b) by 519 days.

(21) Appl. No.: 18/137,746

(22) Filed: Apr. 21, 2023

(65) Prior Publication Data

US 2024/0354152 A1 Oct. 24, 2024

(51) Int. Cl.
*G06F 9/48* (2006.01)
*H04L 41/12* (2022.01)

(52) U.S. Cl.
CPC ............ *G06F 9/4843* (2013.01); *H04L 41/12* (2013.01)

(58) Field of Classification Search
CPC ............................... G06F 9/4843; H04L 41/12
USPC ........................................................ 718/102
See application file for complete search history.

(56) References Cited

U.S. PATENT DOCUMENTS

2004/0078105 A1* 4/2004 Moon .................... G06Q 10/10 700/100
2006/0080417 A1* 4/2006 Boutboul ................ H04L 45/00 709/220
2010/0324948 A1* 12/2010 Kumar ................... G06Q 10/06 705/7.13
2011/0145518 A1* 6/2011 Balko .................... G06Q 10/06 711/E12.001
2020/0204492 A1* 6/2020 Sarva ...................... H04L 67/34
2022/0342700 A1* 10/2022 Harwood ................ G06F 9/466
2023/0409386 A1* 12/2023 Zorin ...................... G06F 9/542

* cited by examiner

*Primary Examiner* — Pierre Vital
*Assistant Examiner* — Jordan Scott Motter
(74) *Attorney, Agent, or Firm* — STERNE, KESSLER, GOLDSTEIN & FOX P.L.L.C.

(57) ABSTRACT

Disclosed herein are system, method, and computer program product embodiments for performing a task. For example, the method includes receiving a triggering event from a client device and generating a processing map. The processing map indicates a processing flow between a plurality of processing instances to execute the task associated with the triggering event. The plurality of processing instances belongs to a topography map specifying a network topography including the plurality of processing instances. For each of the plurality of the processing instances, the method further includes identifying the respective processing instance based on the topography map and outputting the processing map and data associated with the triggering event to the respective processing instance to execute the task.

20 Claims, 11 Drawing Sheets

COMPOSABLE FULLY AUTONOMOUS PROCESSING

TECHNICAL FIELD

Aspects relate to systems and methods for composable fully autonomous processing.

BACKGROUND

Workflows (e.g., digital offer fulfillment) executed by an enterprise system can involve the use of a number of applications or processes (e.g., purchase verification). In a conventional approach, applications may be dependent on each other. For example, a first application may call a second application to perform a task. In another conventional approach, a centralized orchestrator may distribute a plurality of tasks between the applications. In that approach, the centralized orchestrator may manage a processing flow and communication between the applications.

Having a centralized orchestrator and/or dependent applications suffer from a plurality of problems. For example, a fault in the centralized orchestrator or an application may halt data processing. Further, these approaches are not extensible. A change in a business need or in a data traffic pattern may delay or halt data processing for testing and configuring the applications.

What is needed is systems and methods to address the aforementioned problems, and to provide improved techniques for data processing.

SUMMARY

Aspects of this disclosure are directed to systems and methods for performing a task using composable and fully autonomous processing. For example, the method includes receiving a triggering event from a client device and generating a processing map. The processing map indicates a processing flow between a plurality of processing instances to execute the task associated with the triggering event. The plurality of processing instances belong to a topography map specifying a network topography including the plurality of processing instances. For each of the plurality of the processing instance, the method further includes identifying the respective processing instance based on the topography map and outputting the processing map and data associated with the triggering event to the respective processing instance to execute the task.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the art to make and use the aspects.

In the drawings, like reference numbers generally indicate identical or similar elements. Additionally, generally, the left-most digit(s) of a reference number identifies the drawing in which the reference number first appears.

DETAILED DESCRIPTION

Aspects of the present disclosure relate to a system for composable fully autonomous processing. In particular, the present disclosure to fully autonomous processing instances in an enterprise environment to perform a workflow. The workflow can include a plurality of tasks. Workflows performed by an enterprise system can involve the use of a number of processing instances. As an example, a workflow can include a digital offer fulfillment workflow. The digital offer fulfillment workflow can include the following tasks: receive a request from a customer, determine eligibility, and return a status to the customer. Note that the foregoing example of digital offer fulfillment workflow is a simplified workflow that includes exemplary tasks. An actual digital offer fulfillment workflow may involve many more tasks.

System Overview and Function

Figure 1:
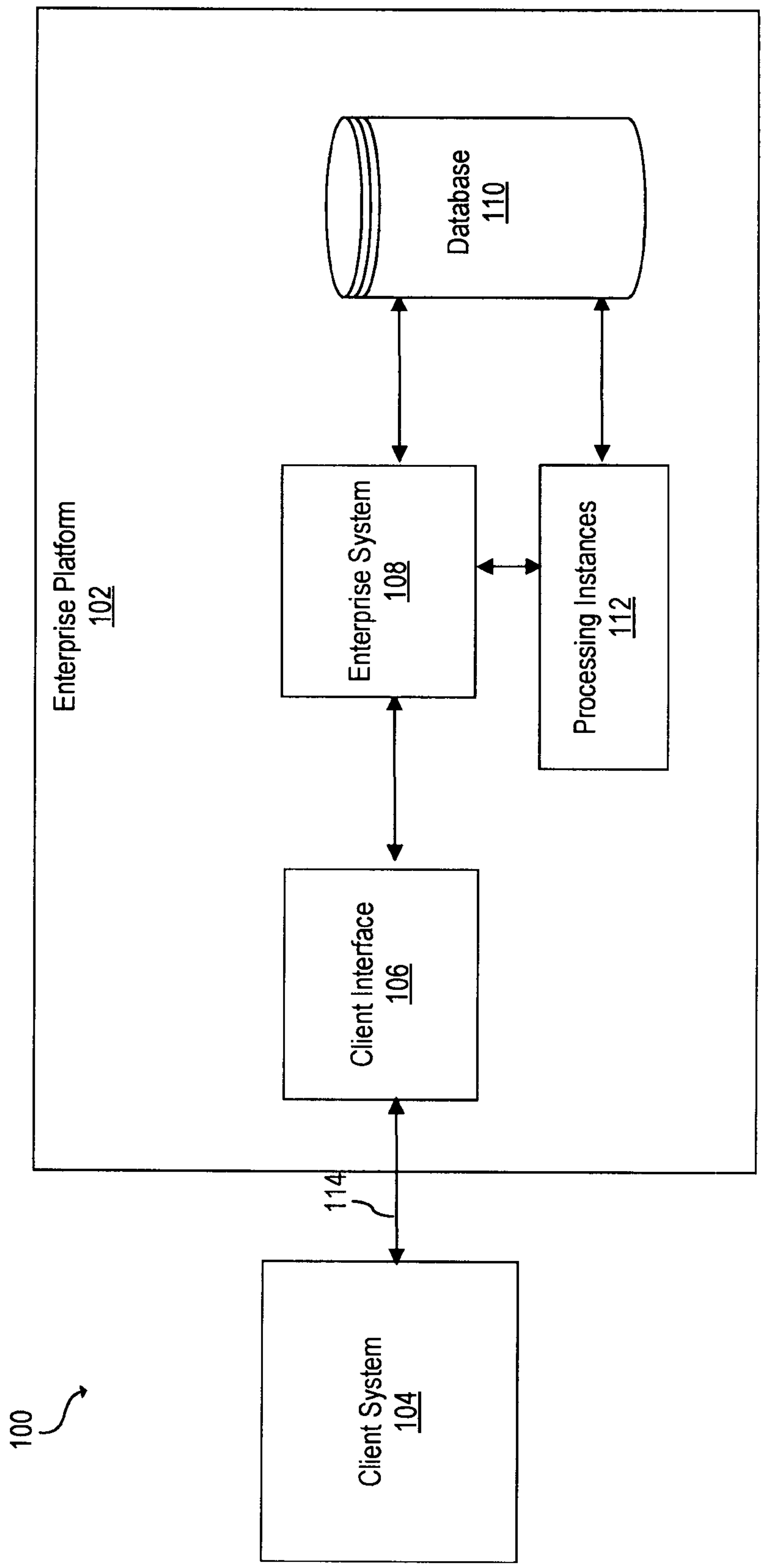
FIG. 1 is a block diagram of an environment for a system that provides composable fully autonomous processing, in accordance with an embodiment of the present disclosure.

FIG. 1 is a block diagram of an environment 100 for composable fully autonomous processing of a workflow, in accordance with an embodiment of the present disclosure. Environment 100 may include an enterprise platform 102 and a client system 104. Enterprise platform 102 may include a client interface 106, an enterprise system 108, a database 110, and processing instances 112. Enterprise platform 102 and enterprise system 108 may operate on one or more servers and/or databases. In some embodiments, enterprise platform 102 may be implemented using computer system 1200 as described further with reference to FIG. 12. Enterprise platform 102 may provide a cluster computing platform or a cloud computing platform to execute functions and workflows designated by client system 104. For example, enterprise platform 102 may receive a triggering event (e.g., a job request, a task request) and may execute a workflow associated the triggering event using processing instances 112. Enterprise system 108 may process or execute the functions using a composable and an autonomous flow.

Client system 104 may be a user device accessing enterprise platform 102 via a network 114. Client system 104 may be a workstation and/or user device used to access, communicate with, and/or manipulate the enterprise platform 102. Client system 104 may access platform 102 using client interface 106. Client interface 106 may be any interface for presenting and/or receiving information to/from a user. An interface may be a communication interface such as a command window, a web browser, a display, and/or any other type of interface. Other software, hardware, and/or interfaces may be used to provide communication between the user and enterprise platform 102. For example, client interface 106 may be a graphical user interface (GUI) provided by enterprise platform 102 and/or via an application programing interface (API) provided by enterprise platform 102.

As used herein, the API may comprise any software capable of performing an interaction between one or more software components as well as interacting with and/or accessing one or more data storage elements (e.g., server systems, databases, hard drives, and the like). An API may comprise a library that specifies routines, data structures, object classes, variables, and the like. Thus, an API may be formulated in a variety of ways and based upon a variety of specifications or standards, including, for example, POSIX, the MICROSOFT WINDOWS API, a standard library such as C++, a JAVA API, and the like.

Network 114 refers to a telecommunications network, such as a wired or wireless network. Network 114 can span and represent a variety of networks and network topologies. For example, network 114 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in network 114. Cable, Ethernet, digital subscriber line (DSL), fiber optic lines, fiber to the home (FTTH), and plain old telephone service (POTS) are examples of wired communication that may be included in the network 114. Further, network 114 can traverse a number of topologies and distances. For example, network 114 can include a direct connection, personal area network (PAN), local area network (LAN), metropolitan area network (MAN), wide area network (WAN), or a combination thereof.

By interacting with the GUI using client system 104, the user may provide data (e.g., parameters) associated with the triggering event. For example, client system 104 may send to enterprise platform 102 an indication that an electronic transaction is authorized. In addition to the indication, client system 104 may send data comprising identification of a customer. In response to receiving the indication and the data, enterprise system 108 may execute a workflow to notify the customer. The workflow may include identifying the customer, retrieving a preferred communication channel associated with the customer (e.g., a text message, a push notification, an email address), and sending a notification to the customer indicating that the electronic transaction is authorized using the preferred communication channel.

To execute the workflow associated with the triggering event (e.g., notify the customer), enterprise system 108 may execute multiple processing tasks using processing instances 112. For example, a first processing instance may be configured to retrieve the preferred communication channel based on the customer identification. First processing instance may retrieve the preferred communication channel from database 110. The first processing instance may send the retrieved preferred communication channel to a second processing instance. The second processing instance may be configured to send the notification to a user device associated with the customer.

In other examples, enterprise platform 102 may receive a request to execute an eligibility determination workflow or a fraud determination workflow. For example, enterprise platform 102 may receive a request from client system 104 to output a risk score or a fraud score. A first processing instance may retrieve data associated with the user (e.g., financial record, past transaction). A second processing instance may determine a risk score based on the data received from the first processing instance. The second processing instance may execute a fraud model (e.g., an artificial intelligence (AI) model).

As described previously herein, enterprise system 108 may execute the workflows using processing instances 112. Processing instances 112 may be processing modules or applications configured to execute one or more processes (i.e., perform a task) (e.g., validate a schema, deliver to an endpoint, retrieve data). Each processing instance is autonomous. That is, each processing instance executes a process without communicating with other processing instances (i.e., independently from other processing instances). In addition, each processing instance may not be aware of other processing instances that are configured to perform other tasks.

To execute the workflow using processing instances 112, enterprise system 108 may group the processing instances 112 into one or more groups or clusters. Clusters of processing instances improve the resiliency of enterprise system 108. In addition, clusters provides the advantage of load balancing. The grouping may be reflected in a topography map as further described in relation to FIG. 4B. The topography map may show available processing instances 112. Further, the topography map indicates a method of communication between processing instances 112. In addition to the topography map, enterprise system 108 may also generates a processing map. The processing map may illustrate the flow of processing through each type of processing instances 112 to achieve a desired outcome based on triggering event received from client system 104. The processing map may show criteria of when to apply the map as further described in relation to FIG. 9.

Once the processing map is generated, enterprise system 108 may send the processing map to each processing instance that belong to the topography map. Processing instances 112 may begin the execution based on the order specified by the processing map. Each processing instance 112 does its processing, uses the processing map to determine the type of the processing instance for the next step (task), and uses the topography map to determine an input point for the processing instance that matches the type of the next step.

Enterprise system 108 described above improves the state of the art from conventional systems in a plurality of ways. By providing composable and autonomous processing, the fault tolerance and scalability is improved. Enterprise system 108 has the ability to separate processing duties for each processing instance. Thus, each processing instance may be optimized to achieve a desired outcome. Further, composability of processing to achieve the desired outcome provides the advantage of optimized usage of processing instances (e.g., allowing sharing or segregation across topographies).

Using processing maps for executing a workflow provides a plurality of advantages. The flow control and execution are separate and independent from each other. Thus, a change in the flow control or topography map does not affect or stop the current task being performed by the processing instance. Enterprise system 108 has no central point of failure that may cause a halt in processing or becomes a bottleneck due to the dynamic configuration of processing. Due to the dynamic configuration, enterprise system 108 may generate a new topography map in response to detecting a fault or a bottleneck in a processing instance. In addition, as processing instances evolve (e.g., new release, new functionality), the processing instance may be tested without interrupting the processing of enterprise platform 102, as described further below.

Figure 2:
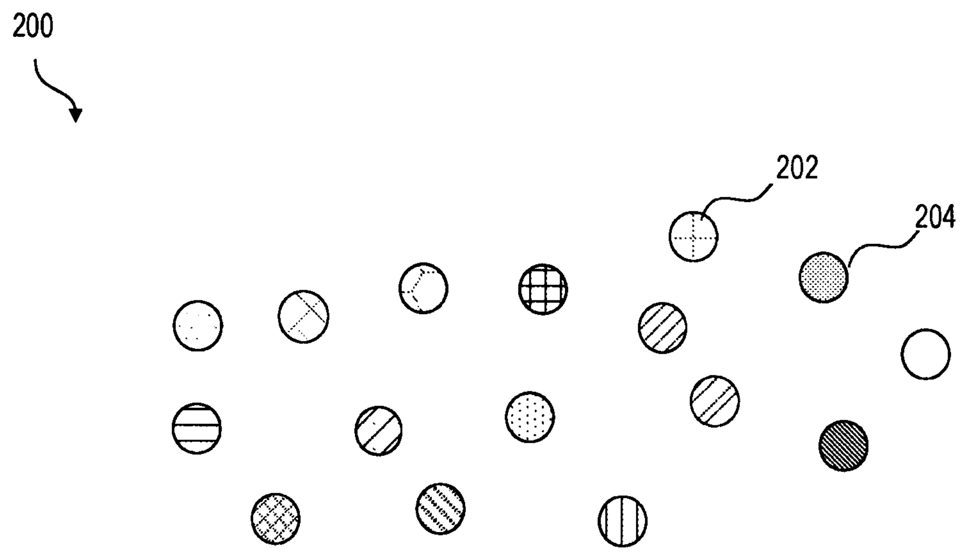
FIG. 2 is a schematic that shows a plurality of autonomous processing instances, in accordance with an embodiment of the present disclosure.

FIG. 2 is a schematic that shows a plurality of autonomous processing instances 200, in accordance with an embodiment of the present disclosure. As described previously herein, each processing instance is configured to achieve a specific objective. A first processing instance 202 may be configured to perform a first task and a second processing instance 204 may be configured to perform a second task different than the first task. Thus, first processing instance 202 and second processing instance 204 may be of different types. In some embodiments, each processing instance may represent a cluster of individual processing instances. In some aspects, the individual instances may perform the same task. Enterprise system 108 may process the cluster of individual instances as an individual processing instance. For example, enterprise system 108 may group the cluster of individual instances in the same topography map. Examples of processes that may be executed by the processing instances may include retrieving data from a data store or a database, processing data, reformatting data, outputting data to a user device or to a storage database, or the like.

The processing instance works autonomously. For example, first processing instance 202 may process data independently from other processing instances (e.g., second processing instance 204). Each processing instance is configured to receive data to process. In addition to receiving data from other processing instances, each processing instance is configured to read the topography map and the processing map in order to output a result. For example, first processing instance 202 may be configured to retrieve data from database 110. Using the topography map and the processing map, first processing instance 202 may determine that it may send the output to second processing instance 204. First processing instance 202 may retrieve the data and send the data to second processing instance 204 regardless of the rest of the flow or the job request received from client system 104.

Figure 3:
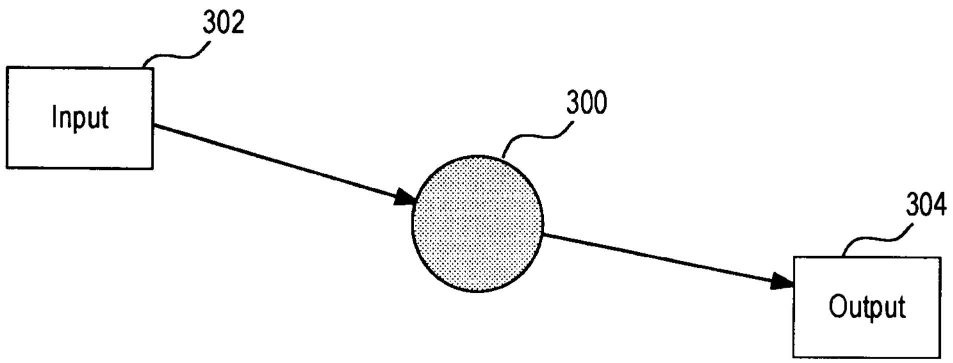
FIG. 3 is a schematic that shows an autonomous processing instance, in accordance with an embodiment of the present disclosure.

FIG. 3 is a schematic that shows an autonomous processing instance 300, in accordance with an embodiment of the present disclosure. Autonomous processing instance 300 may be configured to receive an input 302 and to output an output 304. Autonomous processing instance 300 may execute a process using input 302 to determine output 304. Autonomous processing instance 300 may use the processing map and the topography map to determine where to send output 304. In addition, autonomous processing instance 300 may identify a communication method to be used to communicate with other processing instances using the topography map.

Figure 4A:
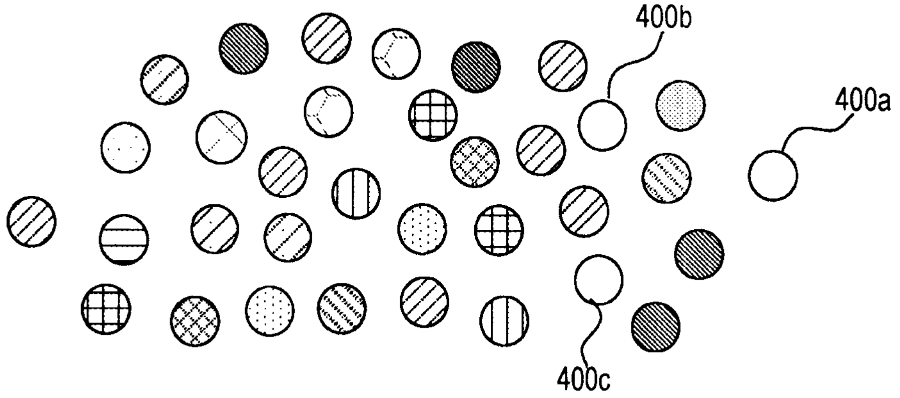
FIG. 4A is a schematic that shows a universe of autonomous processing instances, in accordance with an embodiment of the present disclosure.

FIG. 4A is a schematic that shows a universe of autonomous processing instances, in accordance with an embodiment of the present disclosure. Enterprise system 108 may create the universe of autonomous processing instances. For example, enterprise system 108 may identify one or more available processing instances. The universe of autonomous processing instances comprises a plurality of autonomous processing instances configured to execute multiple processing types. The universe of processing instances can also include two or more processing instances that do the same type of processing. For example in FIG. 4A, processing instance 400*a*, processing instance 400*b*, and processing instance 400*c* may be configured to perform the same type of processing. In the drawings, the fill pattern for each illustrated processing instance is used to show a type of processing. That is, two processing instance that have matched fill pattern perform the same task (e.g., are of the same type). The universe is fluid (i.e., processing instances may be added or removed from the universe). For example, if a fault is detected at processing instance 400*b*, processing instance 400*b* may be removed from the universe. Thus while the universe is fluid before processing can happen, enterprise system 108 may determine which autonomous processing instances are available. Then, enterprise system 108 may generate a topography map based on the universe.

Figure 4B:
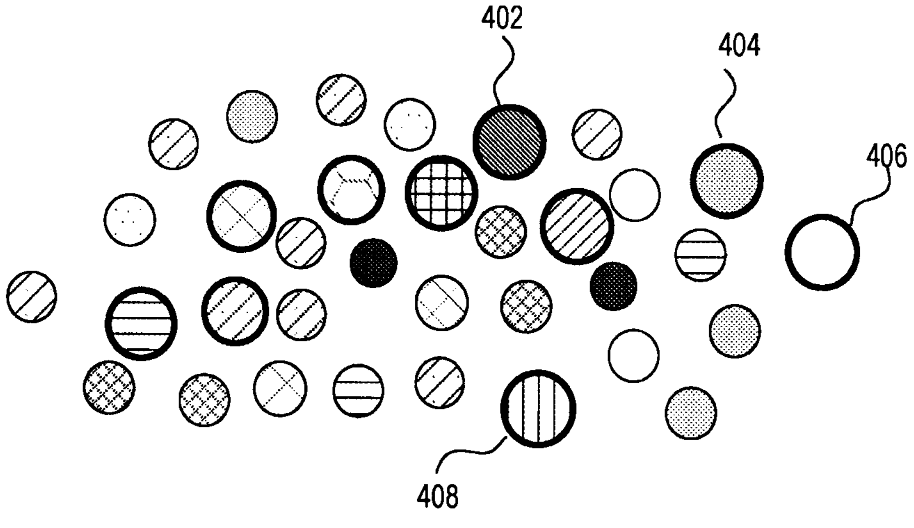
FIG. 4B is a schematic that illustrates a topography map, in accordance with an embodiment of the present disclosure.

FIG. 4B is a schematic that illustrates a topography map, in accordance with an embodiment of the present disclosure. The topography maps limit the universe of autonomous processing instances to populations that may be used to achieve a desired outcome. The topography map specifies a network topology that includes the plurality of processing instances. The grouping may be based on a location of a data center or a database. For example, processing instances that belong to the same topography map may be located in one country or in a single location. In FIG. 4B, the processing instance represented with a bolded circumference belong to the same topography map. For example, processing instances 402, 404, 406, and 408 may belong to the same topography map.

As discussed previously herein, the topography map shows each processing instance how to communicate to a processing instance of a different type that belongs to the same topography map. Each processing instance may communicate via a different method or a different protocol. The topography map may indicate the communication method for each processing instance. For example, the topography map may indicate a web address, an internet protocol (IP), or other methods of communication for each processing instance that belongs to the topography map. In some embodiments, communication between processing instances may use a queuing messaging model such as Kafka. Each processing instance can identify what other processing instances are available and may communicate with them using the communication methods included in the topography map.

In some embodiments, the topography map limits the population of processing instances to include a single processing instance of any specific type of processing. If more than a single processing instance of any type of process are present in the topography map, the execution of the processing described later herein can be hindered. In other embodiments, two or more of processing instances may be included in a topography map to improve fault tolerance as further described below.

Figure 5:
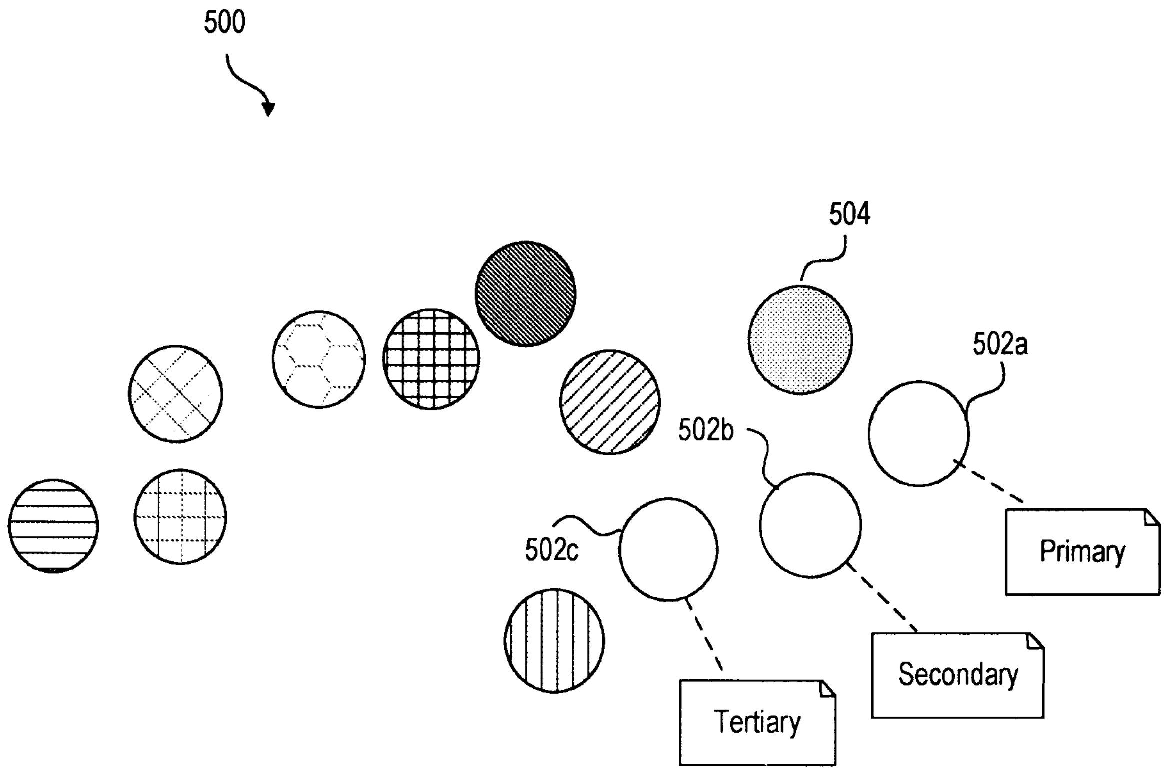
FIG. 5 is a schematic that illustrates a topography map with fault tolerance, in accordance with an embodiment of the present disclosure.

FIG. 5 is a schematic that shows a topography map 500 for fault tolerance, in accordance with an embodiment of the present disclosure. In some embodiments, including two or more processing instances of the same type in a single topography may be desired to increase the fault tolerance of enterprise platform 102. In addition to each processing instance potentially being a cluster for fault tolerance, multiple processing instances of the same type may be included within the same topography map with an order of precedence. For example, topography map 500 includes three processing instances 502*a*, 502*b*, and 502*c* that are configured to execute the same process. Topography map 500 may indicate an order of precedence. Processing instance 502*a* may be a primary processing instance, processing instance 502*b* may be a secondary processing instance, and processing instance 502*c* may be a tertiary processing instance. A primary processing instance does all the processing unless the primary processing instance is not available. If the primary processing instance is not available, the secondary processing instance does all the processing unless the secondary processing instance is not available. If the secondary processing instance is not available, the tertiary processing instance may do all the processing. The topography map includes information on which processing instances are primary, secondary, tertiary, etc. to enable fault tolerance.

A processing instance 504 may communicate to primary processing instance 502*a*. In response to determining that primary processing instance 502*a* is not available, processing instance 504 may communicate to secondary processing instance 502*b*. As described previously herein, processing instance 504 may identify primary processing instance 502*a* and secondary processing instance 502*b* using topography map 500. This can improve fault tolerance and load balance because if a processing instance is not available (e.g., fault or overload), another available processing instance is used.

In some embodiments, processing instances may be upgraded (a different version) without affecting the availability of enterprise platform 102. For example, while primary processing instance 502*a* is upgraded, the tasks are sent to the other processing instances (e.g., secondary processing instance 502*b*, tertiary processing instance 502*c*).

In some embodiments, secondary processing instances may be used as a backup during testing of the primary processing instance. For example during testing of primary processing instance 502*a*, a first portion of the traffic may be sent to primary processing instance 502*a* while the rest of the traffic is sent to secondary processing instance 502*b*. For example, about 1% of the traffic may be sent to primary processing instance 502*a* and the remaining 99% of the traffic may be sent to secondary processing instance 502*b*. This provides the advantage of testing an upgraded processing instance without the risk of increasing the numbers of errors or faults in enterprise platform 102.

Figure 6:
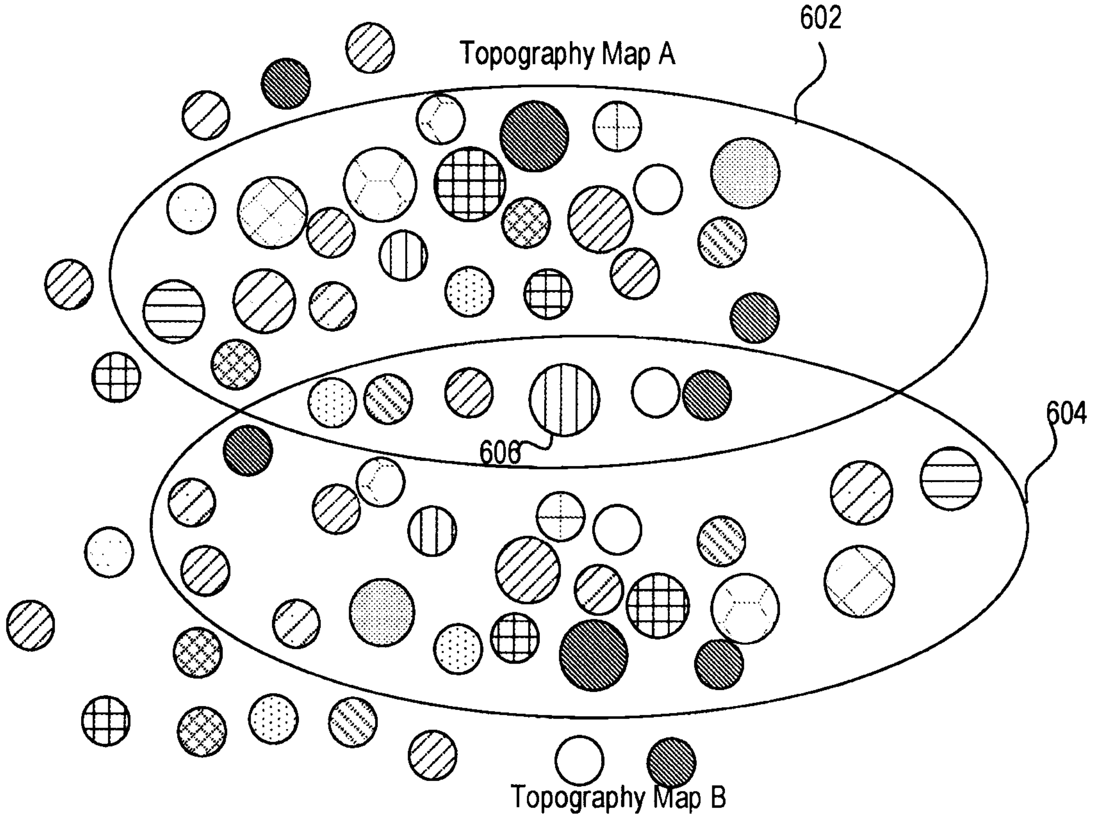
FIG. 6 is a schematic that shows overlapping topography maps, in accordance with an embodiment of the present disclosure.

FIG. 6 is a schematic that shows overlapping topography maps, in accordance with an embodiment of the present disclosure. As discussed previously herein, enterprise system 108 may generate multiple topography maps using the universe of processing instances. A single processing instance may be mapped to multiple topography maps. For example, a processing instance 606 may be used by two different topography maps: a first topography map 602 and a second topography map 604. Using overlapping topography maps improves the resiliency of enterprise system 108. For example, during runtime a new topology (i.e., topography map) may be created that includes processing instance 606 without halting the process that is being executed by processing instance 606.

In addition to creating new topology maps, a processing instance may be removed from a topography map or added to the topography map without affecting the processing of other processing instances. Thus, topography maps may be updated or reorganized without adversely affecting enterprise system 108. The topography maps held by each processing instance are updated as desired. Changes to topography maps are communicated to the processing instances as each processing instance uses the topography map to which it belongs in order to identify the other processing instance that receive its output. Enterprise system 108 may employ a plurality of techniques to communicate the topography map to each processing instance such that each processing instance knows the topography maps to which it belongs. Each processing instance holds a copy of the topography maps provided to it. A processing instance may query a database, call a configured process, or push the topography map to other processing instances that belongs to the topography map. Regardless of the technique used to obtain the updated topography map, the connection to a source of topography maps is transient and processing continues unabated even if the source of topography maps becomes unavailable (e.g. enterprise system 108).

Figure 7A:
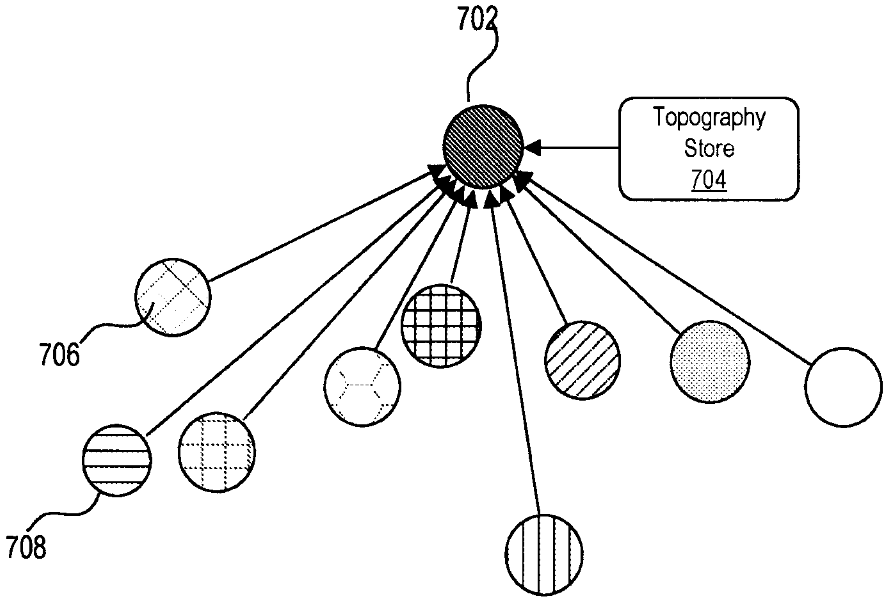
FIG. 7A is a diagram that illustrates a pull topography for topography map updates, in accordance with an embodiment of the present disclosure.

FIG. 7A is a diagram that illustrates a pull topography for topography map updates, in accordance with an embodiment of the present disclosure. A topography store 704 may send a topography map to a processing instance 702. Other processing instances 706, 708 may pull processing instance 702 to obtain an updated topography map. Processing instances 706, 708 may pull at regular intervals to check whether an updated topography map is available. Enterprise system 108 may store the generated or updated topography map in topography store 704.

Figure 7B:
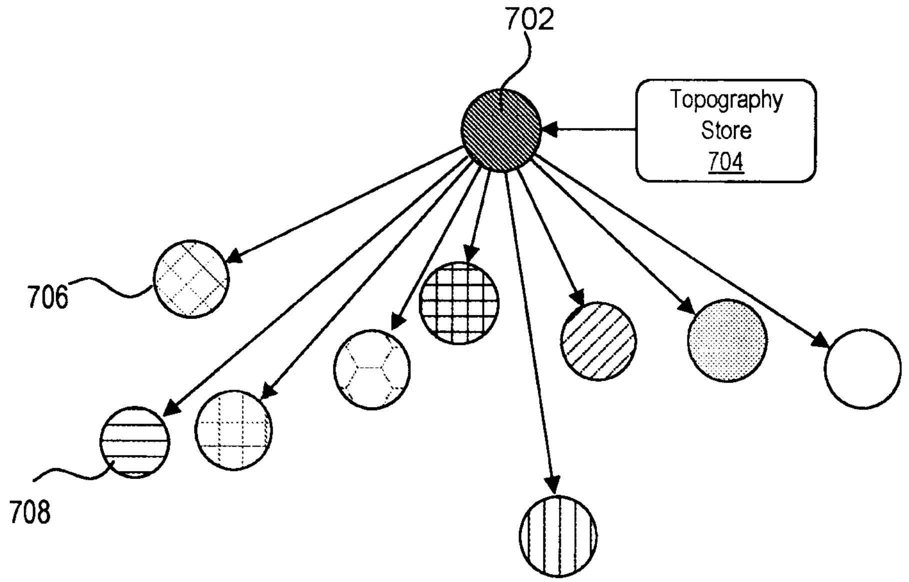
FIG. 7B is a diagram that illustrates a push topography for topography map updates, in accordance with an embodiment of the present disclosure.

FIG. 7B is a diagram that illustrates a push topography for topography map updates, in accordance with an embodiment of the present disclosure. Processing instance 702 may receive a topography map (or an updated topography map) from topography store 704. In turn, processing instance 702 may push the processing map to each processing instance that is included in the topography map.

Since processing instances are independent of each other, the dissemination of topography maps provides the following advantages. New types of processing can be added to the universe of processing instances and included in topography maps without interrupting existing processing instances. An update to a topography map may exclude a processing instance of a certain type and add a different instance of the same type. In addition, a topography map may be partially or completely reconfigured at any time. Since there is no dependency between processing instances, the topography map may be changed during processing without negatively impacting the execution of processing and achieving the desired outcome.

In some embodiments, enterprise system 108 may update topographies based on traffic workload. For example, enterprise system 108 may update the topography map to avoid the occurrence of a hotspot. If a processing instance in the topography map is experiencing a high traffic volume (e.g., large number of requests) then the topography map may be modified such that the processing instance receives less traffic. Enterprise system 108 may monitor traffic for a plurality of topography maps and processing instances and update the topography maps accordingly.

Figure 8A:
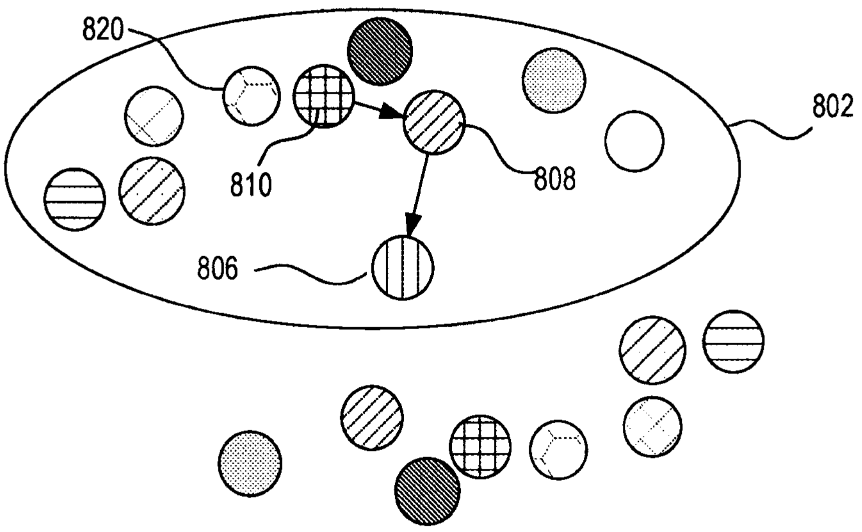
FIGS. 8A and 8B are diagrams that illustrate a flow between processing instances before and after a topography map update, in accordance with an embodiment of the present disclosure.
Figure 8B:
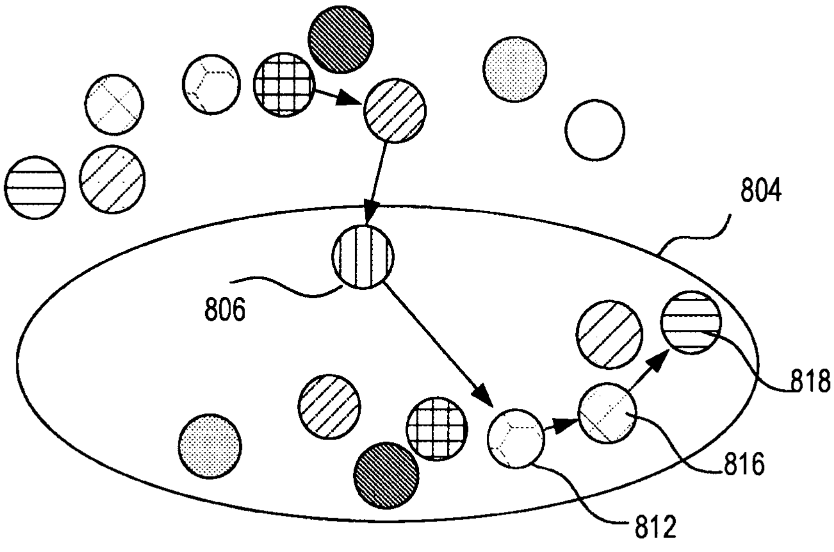

FIGS. 8A and 8B are diagrams that illustrate a flow between processing instances before and after a topography map update, in accordance with an embodiment of the present disclosure. A first topography map 802 may be changed to a second topography map 804 without having a negative impact on achieving the desired outcome. In first topography map 802, the flow of processing is from processing instance 810 to processing instance 808 to processing instance 806. Before processing instance 806 completes the processing, second topography map 804 is received by processing instance 806. Processing instance 806 now belongs to second topography map 804.

Second topography map 804 includes all the needed types of processing instances to complete the processing. The desired outcome is achieved without having a negative impact on the processing flow. Once processing instance 806 has completed the processing it sends the output to processing instance 812. The processing flow continues to processing instances 816, 818 uninterrupted.

Processing instances 812, 816, 818 are identified using second topography map 804. Processing instance 806 uses topography map 804 to determine where to send its output when applying the processing map. Thus, processing instance 806 determines to send the output to processing instance 812 instead of processing instance 820 of first topography map 802. In addition, topography map contains information on where each processing instance receives its input from. That allows each processing instance in the topography map to know how to provide its output as input to another processing instance. If the input to a processing instance is a queue or other technology that supports it, the processing instances can also use the topography map to determine where to receive their input. This increases the dynamic nature of the topography map.

The change from first topography map 802 to topography map 804 may be due to a fault that occurs at a datacenter or server in a first location that affect one or more of the processing instances of first topography map 802. Thus, enterprise system 108 modifies first topography map 802 and generates second topography map 804. Second topography map 804 may include processing instances that are not affected by the fault (e.g., running on a server in a second location). As discussed above each processing instance that belongs to second topography map 804 receives second topography map 804 and can use second topography map 804 and the processing map to determine the subsequent processing instance. Thus, the workflow is executed and the desired outcome is obtained regardless of the fault.

Figure 9:
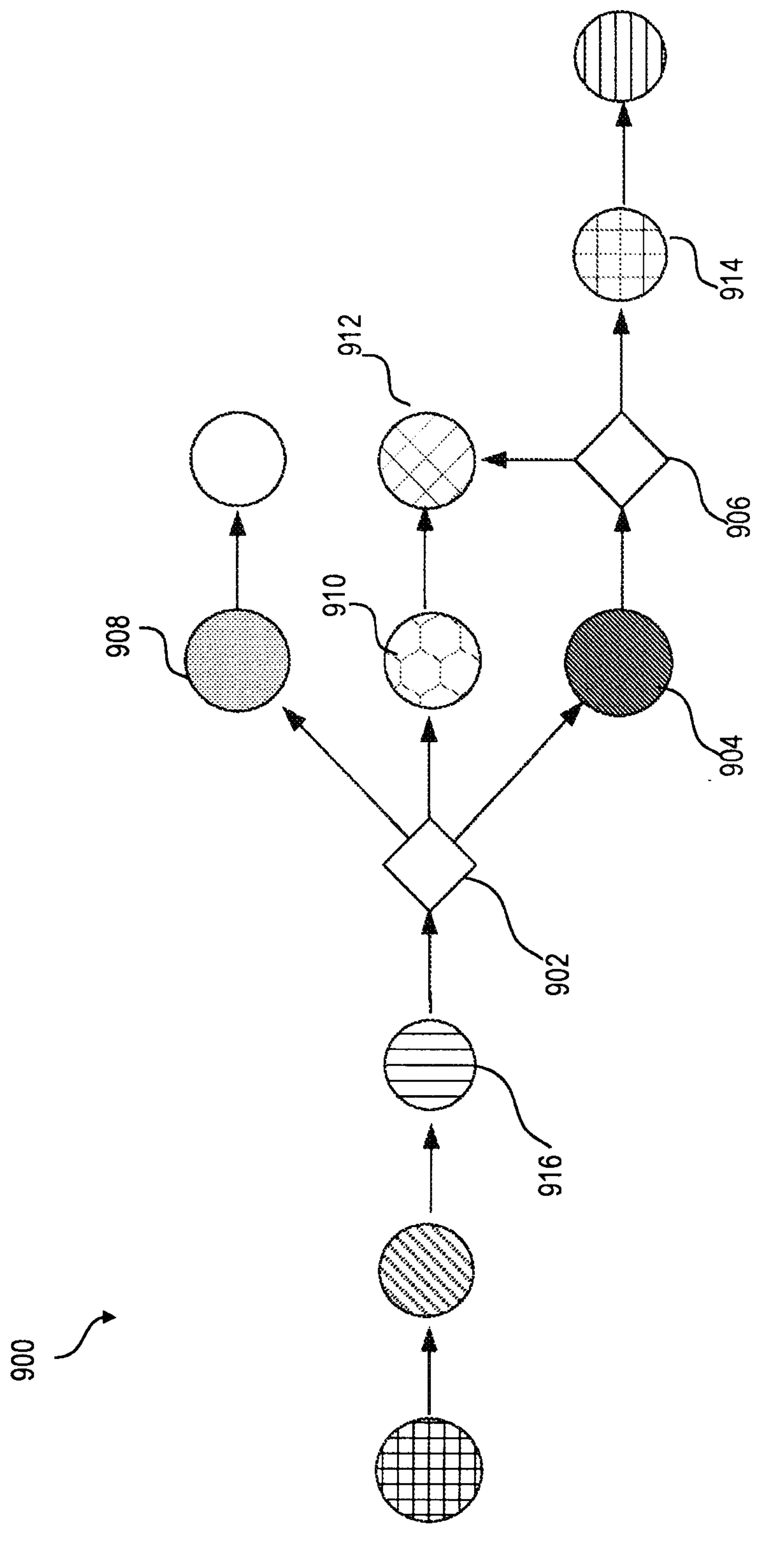
FIG. 9 is a schematic of a processing map, in accordance with an embodiment of the present disclosure.

FIG. 9 is a schematic of a processing map 900, in accordance with an embodiment of the present disclosure. Processing map 900 determines the flow of processing to achieve a desired outcome. Processing map 900 represents an abstract workflow between the processing instances of a topography map. Processing map 900 indicates the types of processing to execute in the flow to achieve the desired outcome. In FIG. 9, different types of processing instances are represented with circles having a different fill pattern. Processing map 900 can include conditional processing, parallel processing, or the like. Processing map 900 does not determine where the processing may occur (e.g., which processing instance will perform the task) but outlines the flow of processing between different types of processing instances. For example, processing map 900 indicates a processing instance of type 916 has to output to a processing instance of type 908, a processing instance of type 910, or a processing instance of type 904 based on a condition 902. Processing instance of type 910 outputs to a processing instance of type 912. Processing instance of type 904 outputs to processing instance of type 912 or to a processing instance of type 914 based on a condition 906.

When enterprise system 108 receives an input to process (e.g., a triggering event), enterprise system 108 determines the processing map to apply. Enterprise system 108 attaches the processing map to the data received with the input or the triggering event. Then, enterprise system 108 sends the processing map and the data to the processing instances. Enterprise system 108 can use different means to evaluate the criteria for the selection of the appropriate processing map. Since the processing map contains all the steps to achieve the desired outcome, the input can flow through processing without an external orchestrator. The flow may be updated. Enterprise system 108 attaches changes to the processing map to a new input. Changes to the flow have no impact on input that is already being processing.

Figure 10:
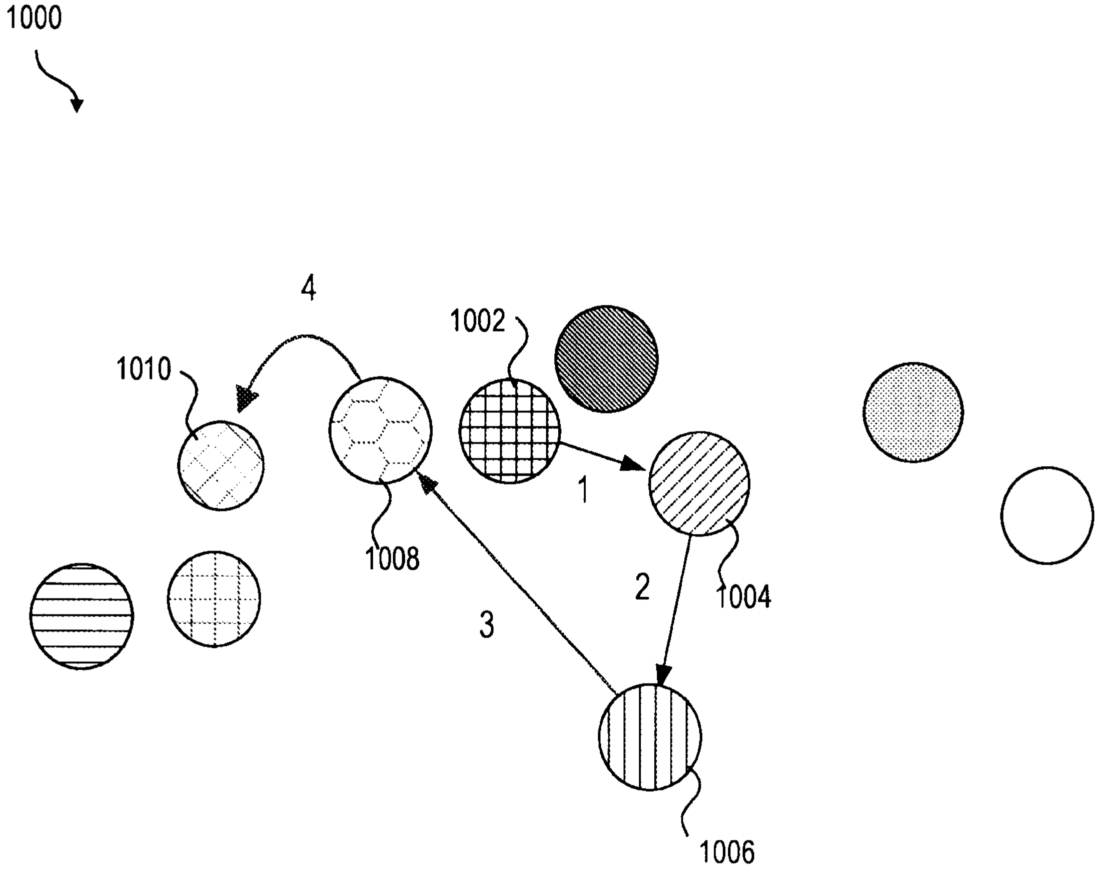
FIG. 10 is a diagram that shows a processing flow based on the processing map and the topography map, in accordance with an embodiment of the present disclosure.

FIG. 10 is a diagram that show a processing flow 1000 based on processing map 900 and second topography map 804, in accordance with an embodiment of the present disclosure. As described previously herein, each processing instance is configured to read the processing map and the topography map.

A processing instance 1002 determines from second processing map 900 the type of the processing instance for the subsequent task and then identifies a processing instance 1004 from second topography map 804. Similarly, processing instance 1004 identifies processing instance 1006. The flow continues to processing instance 1008 and processing instance 1010.

Methods of Operation

Figure 11:
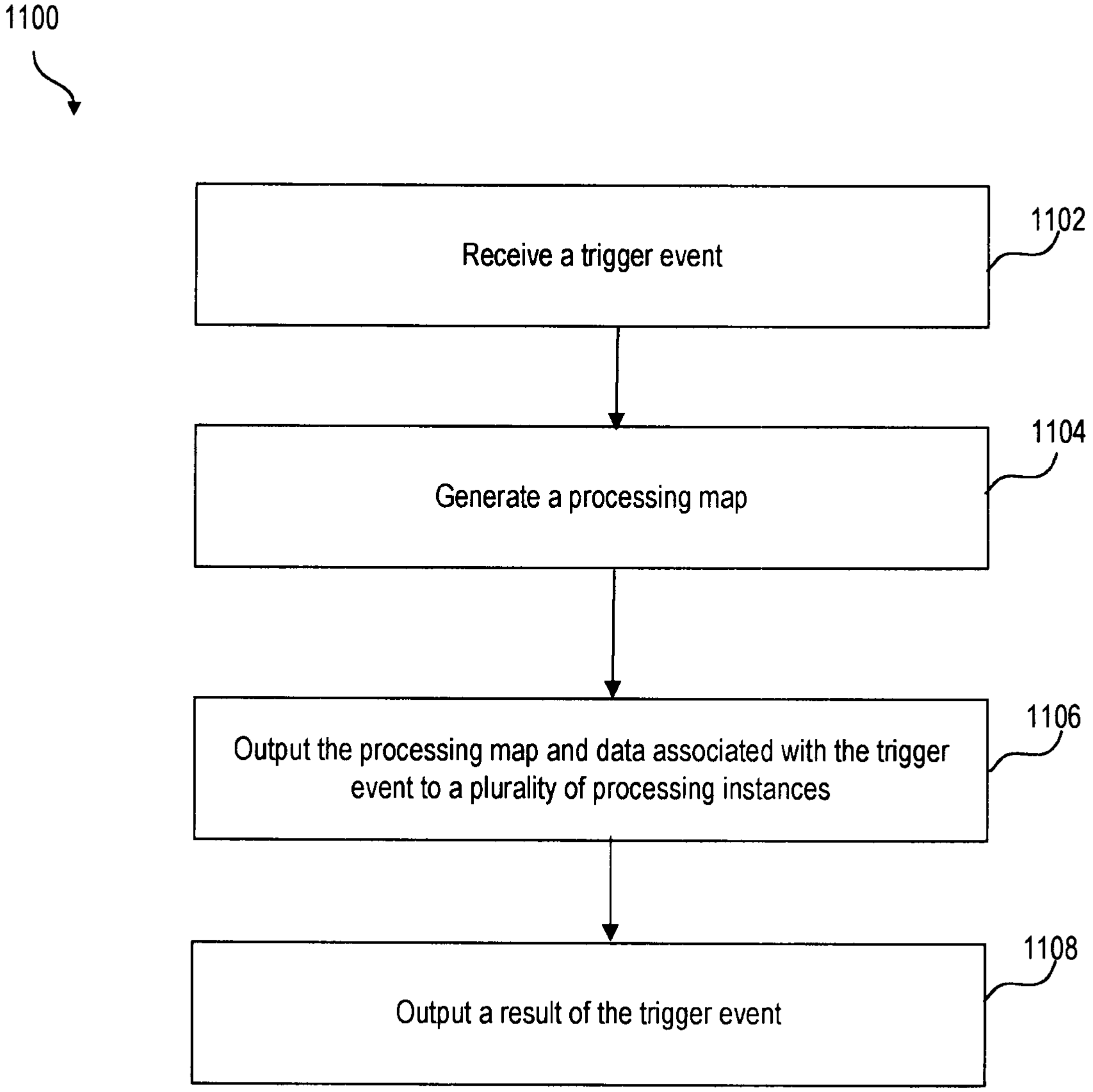
FIG. 11 is an example method of operating the system for composable fully autonomous processing, in accordance with an embodiment of the present disclosure.

FIG. 11 is an example method 1100 of operating enterprise platform 102 for performing a task in accordance with an embodiment of the present disclosure. Method 1100 may be performed as a series of steps by a computing unit such as a processor.

At 1102, enterprise system 108 may create a universe of processing instances. That is, enterprise system 108 may identify the processing instances that are available. Enterprise system 108 may receive a triggering event from client system 104. Enterprise system 108 may create a topography map. The topography map may specify a network topography that includes a plurality of processing instances. Enterprise system 108 may identify the plurality of processing instances from the universe of processing instances to achieve a desired outcome or a task based on the triggering event.

At 1104, enterprise system 108 may generate a processing map. The processing map indicates a processing flow between a plurality of processing instances to execute the task associated with the triggering event. In addition, the processing map may include criteria to when to apply the processing map.

At 1106, enterprise system 108 may output the processing map and data associated with the triggering event to each processing instance of the plurality of processing instances that belongs to the topography map. In some aspects, enterprise system 108 may output the processing map and the data in an order specified by the processing flow. Each processing instance may begin the processing based on the processing flow. Each processing instance may use the processing map to determine the type of the processing instance for a subsequent task and use the topography map to determine an input point for the processing instance that matches the type of the subsequent step.

At 1108, enterprise system 108 may output a result of the triggering event. In some aspects, the output may represent the last task in the processing flow.

Components of the System

Figure 12:
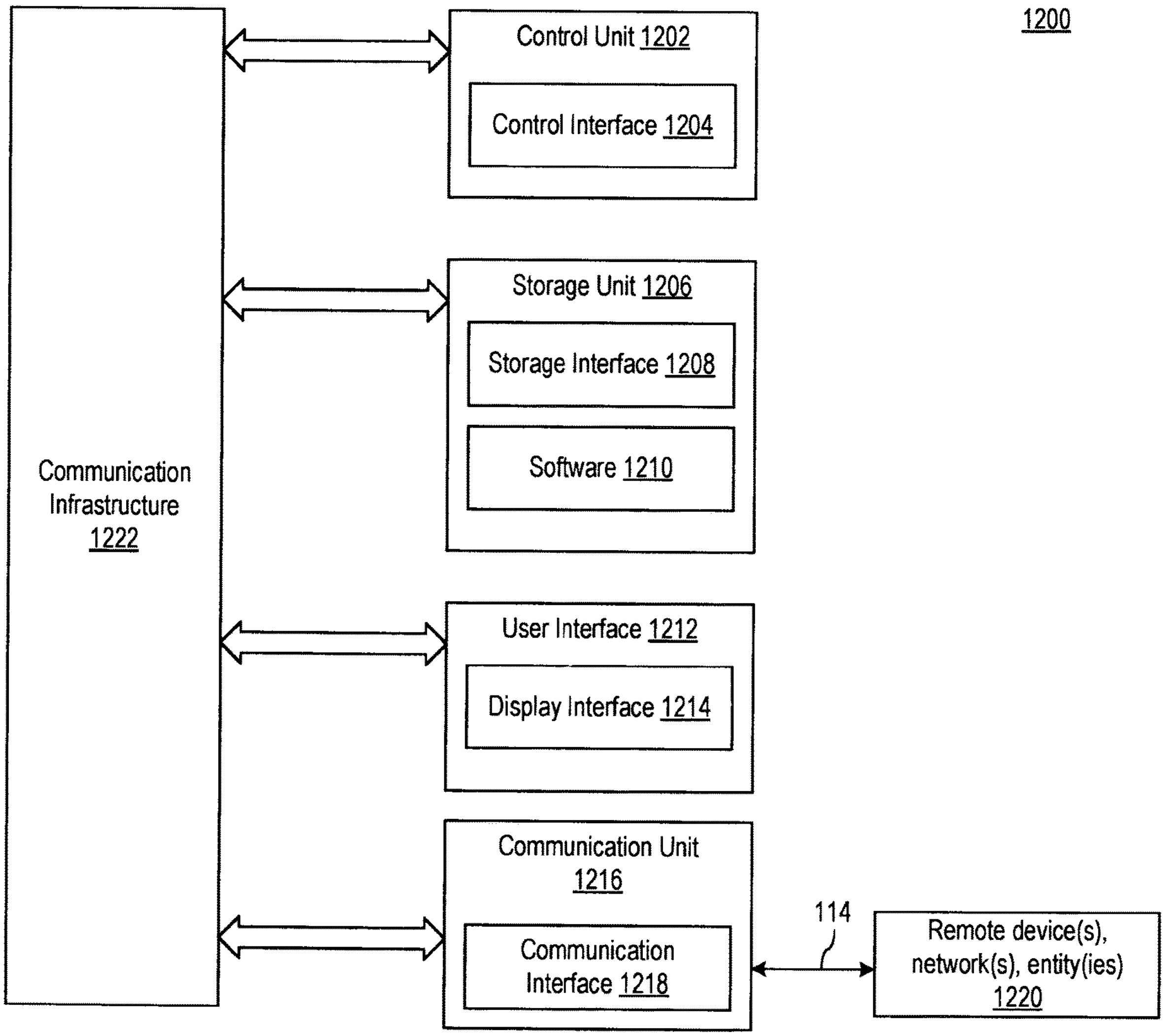
FIG. 12 is an example architecture of components for devices that may be used to implement the system, in accordance with an embodiment of the present disclosure.

FIG. 12 is an example architecture 1200 of components for devices that may be used to implement enterprise system 108 and/or enterprise platform 102 according to aspects. The components may be the components of the computing device or servers on which enterprise system 108 is implemented. In aspects, the components may include a control unit 1202, a storage unit 1206, a communication unit 1216, and a user interface 1212. The control unit 1202 may include a control interface 1204. The control unit 1202 may execute a software 1210 to provide some or all of the intelligence of enterprise system 108. The control unit 1202 may be implemented in a number of different ways. For example, the control unit 1202 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 1204 may be used for communication between the control unit 1202 and other functional units or devices of enterprise system 108. The control interface 1204 may also be used for communication that is external to the functional units or devices of enterprise system 108. The control interface 1204 may receive information from the functional units or devices of enterprise system 108, or from remote devices 1220, such a client device, or may transmit information to the functional units or devices of enterprise system 108, or to remote devices 1220. The remote devices 1220 refer to units or devices external to enterprise system 108.

The control interface 1204 may be implemented in different ways and may include different implementations depending on which functional units or devices of system enterprise system 108 or remote devices 1220 are being interfaced with the control unit 1202. For example, the control interface 1204 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 1204 may be connected to a communication infrastructure 1222, such as a bus, to interface with the functional units or devices of enterprise system 108 or remote devices 1220.

The storage unit 1206 may store the software 1210. For illustrative purposes, the storage unit 1206 is shown as a single element, although it is understood that the storage unit 1206 may be a distribution of storage elements. Also for illustrative purposes, the storage unit 1206 is shown as a single hierarchy storage system, although it is understood that the storage unit 1206 may be in a different configuration. For example, the storage unit 1206 may be formed with different storage technologies forming a memory hierarchical system including different levels of caching, main memory, rotating media, or off-line storage. The storage unit 1206 may be a volatile memory, a nonvolatile memory, an internal memory, an external memory, or a combination thereof. For example, the storage unit 1206 may be a nonvolatile storage such as nonvolatile random access memory (NVRAM), Flash memory, disk storage, or a volatile storage such as static random access memory (SRAM) or dynamic random access memory (DRAM).

The storage unit 1206 may include a storage interface 1208. The storage interface 1208 may be used for communication between the storage unit 1206 and other functional units or devices of enterprise system 108. The storage interface 1208 may also be used for communication that is external to enterprise system 108. The storage interface 1208 may receive information from the other functional units or devices of enterprise system 108 or from remote devices 1220, or may transmit information to the other functional units or devices of enterprise system 108 or to remote devices 1220. The storage interface 1208 may include different implementations depending on which functional units or devices of enterprise system 108 or remote devices 1220 are being interfaced with the storage unit 1206. The storage interface 1208 may be implemented with technologies and techniques similar to the implementation of the control interface 1204.

The communication unit 1216 may enable communication to devices, components, modules, or units of enterprise system 108 or to remote devices 1220. For example, the communication unit 1216 may permit the enterprise system 108 to communicate between the servers on which the enterprise system 108 is implemented and the client device. The communication unit 1216 may further permit the devices of enterprise system 108 to communicate with remote devices 1220 such as an attachment, a peripheral device, or a combination thereof through the network 114.

As previously indicated with respect to FIG. 1, the network 114 may span and represent a variety of networks and network topologies. For example, the network 114 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 114. Cable, Ethernet, digital subscriber line (DSL), fiber optic lines, fiber to the home (FTTH), and plain old telephone service (POTS) are examples of wired communication that may be included in the network 114. Further, the network 114 may traverse a number of network topologies and distances. For example, the network 114 may include direct connection, personal area network (PAN), local area network (LAN), metropolitan area network (MAN), wide area network (WAN), or a combination thereof.

The communication unit 1216 may also function as a communication hub allowing enterprise system 108 to function as part of the network 114 and not be limited to be an end point or terminal unit to the network 114. The communication unit 1216 may include active and passive components, such as microelectronics or an antenna, for interaction with the network 114.

The communication unit 1216 may include a communication interface 1218. The communication interface 1218 may be used for communication between the communication unit 1216 and other functional units or devices of enterprise system 108 or to remote devices 1220. The communication interface 1218 may receive information from the other functional units or devices of enterprise system 108, or from remote devices 1220, or may transmit information to the other functional units or devices of the enterprise system 108 or to remote devices 1220. The communication interface 1218 may include different implementations depending on which functional units or devices are being interfaced with the communication unit 1216. The communication interface 1218 may be implemented with technologies and techniques similar to the implementation of the control interface 1204.

The user interface 1212 may present information generated by enterprise system 108. In aspects, the user interface 1212 allows the users to interface with the enterprise system 108. The user interface 1212 can allow users of the enterprise system 108 to interact with the enterprise system 108. The user interface 1212 may include an input device and an output device. Examples of the input device of the user interface 1212 may include a keypad, buttons, switches, touchpads, soft-keys, a keyboard, a mouse, or any combination thereof to provide data and communication inputs. Examples of the output device may include a display interface 1214. The control unit 1202 may operate the user interface 1212 to present information generated by enterprise system 108. The control unit 1202 may also execute the software 1210 to present information generated by enterprise system 108, or to control other functional units of enterprise system 108. The display interface 1214 may be any graphical user interface such as a display, a projector, a video screen, or any combination thereof.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The modules or units in the following description of the aspects may be coupled to one another as described or as shown. The coupling may be direct or indirect, without or with intervening items between coupled modules or units. The coupling may be by physical contact or by communication between modules or units.

The above detailed description and aspects of the disclosed enterprise system 108 are not intended to be exhaustive or to limit the disclosed enterprise system 108 to the precise form disclosed above. While specific examples for enterprise system 108 are described above for illustrative purposes, various equivalent modifications are possible within the scope of the disclosed enterprise system 108, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method 1200 and enterprise system 108 are cost-effective, highly versatile, and accurate, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

These and other valuable aspects of the present disclosure consequently further the state of the technology to at least the next level. While the disclosed aspects have been described as the best mode of implementing enterprise system 108, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of aspects. However, it will be apparent that aspects may be practiced without these specific details. To avoid obscuring an aspect, some well-known circuits, system configurations, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system may be operated in any orientation.

Certain aspects have other steps or elements in addition to or in place of those mentioned. The steps or elements will become apparent to those skilled in the art from a reading of the following detailed description when taken with reference to the accompanying drawings.

What is claimed is:

1. A computer implemented method, comprising:

receiving, by at least one processor, a triggering event from a client device;

generating, by the at least one processor, a processing map, wherein the processing map indicates a processing flow between a plurality of processing instances to execute a task associated with the triggering event, the processing flow specifying, for each of a plurality of steps of the task, a respective type of processing to be performed;

generating or selecting, by the at least one processor, a topography map specifying a network topography including the plurality of processing instances, wherein the topography map maps each respective type of processing to a corresponding input point for at least one processing instance that performs the respective type of processing; and outputting, by the at least one processor, the processing map and data associated with the triggering event to multiple processing instances of the plurality of processing instances, wherein each of the multiple processing instances is configured to autonomously perform an identification process upon receiving the processing map and the data associated with the triggering event and having access to a respective locally stored copy of the topography map, and wherein the identification process comprises:

executing a respective step of the task;

reading the processing map to determine a subsequent type of processing for a subsequent step;

identifying, based on the respective locally stored copy of the topography map and based on the subsequent type of processing, a subsequent processing instance by identifying an input point of the subsequent processing instance mapped to the subsequent type of processing in the respective locally stored copy of the topography map; and outputting a result of the respective step to the identified input point of the subsequent processing instance, wherein each of the multiple processing instances continues execution using its respective locally stored copy of the topography map irrespective of availability of the topography map after receipt of the respective locally stored copy of the topography map.

2. The method of claim 1, further comprising:

generating the topography map by grouping two or more processing instances based on a plurality of factors, wherein each processing instance is configured to execute a processing task and wherein the processing task executed by a first processing instance is different from the processing task executed by a second processing instance.

3. The method of claim 1, wherein a first processing instance of the plurality of processing instances is mapped to a first topography map and to a second topography map, different from the first topography map.

4. The method of claim 1, wherein the topography map comprises two or more processing instances configured to execute a same processing task with an order of precedence, and wherein a processing instance is configured to send an output to a highest-precedence available processing instance of the two or more processing instances.

5. The method of claim 1, further comprising:

updating the topography map; and outputting the updated topography map to processing instances associated with the updated topography map.

6. The method of claim 5, further comprising:

detecting a potential overload at a processing instance; and updating the topography map to prevent the potential overload at the processing instance.

7. The method of claim 1, further comprising:

receiving a request for a topography map update from a processing instance; and in response to a determination that an updated topography map is available, sending the updated topography map to the plurality of processing instances associated with the updated topography map.

8. A system, comprising:

a memory; and at least one processor coupled to the memory and configured to:

receive a triggering event from a client device;

generate a processing map, wherein the processing map indicates a processing flow between a plurality of processing instances to execute a task associated with the triggering event, the processing flow specifying, for each of a plurality of steps of the task, a respective type of processing to be performed;

generate or select a topography map specifying a network topography including the plurality of processing instances, wherein the topography map maps each respective type of processing to a corresponding input point for at least one processing instance that performs the respective type of processing; and output the processing map and data associated with the triggering event to multiple processing instances of the plurality of processing instances, wherein each of the multiple processing instances is configured to autonomously perform an identification process upon receiving the processing map and the data associated with the triggering event and having access to a respective locally stored copy of the topography map, and wherein the identification process comprises:

executing a respective step of the task;

reading the processing map to determine a subsequent type of processing for a subsequent step;

identifying, based on the respective locally stored copy of the topography map and based on the subsequent type of processing, a subsequent processing instance by identifying an input point of the subsequent processing instance mapped to the subsequent type of processing in the respective locally stored copy of the topography map; and outputting a result of the respective step to the identified input point of the subsequent processing instance, wherein each of the multiple processing instances continues execution using its respective locally stored copy of the topography map irrespective of availability of the topography map after receipt of the respective locally stored copy of the topography map.

9. The system of claim 8, wherein the at least one processor is further configured to:

group two or more processing instances to form the topography map based on a plurality of factors, wherein each processing instance is configured to execute a processing task, and wherein the processing task executed by a first processing instance is different from the processing task executed by a second processing instance.

10. The system of claim 8, wherein a first processing instance of the plurality of processing instances is mapped to a first topography map and to a second topography map, different from the first topography map.

11. The system of claim 8, wherein the topography map comprises two or more processing instances configured to execute a same processing task with an order of precedence, and wherein a processing instance is configured to send an output to a highest-precedence available processing instance of the two or more processing instances.

12. The system of claim 8, wherein the at least one processor is further configured to:

update the topography map; and output the updated topography map to processing instances associated with the updated topography map.

13. The system of claim 12, wherein the at least one processor is further configured to:

detect a potential overload at a processing instance; and update the topography map to prevent the potential overload at the processing instance.

14. The system of claim 8, wherein the at least one processor is further configured to:

receive a request for a topography map update from a processing instance; and in response to a determination that an updated topography map is available, send the updated topography map to another plurality of processing instances associated with the updated topography map.

15. A non-transitory computer-readable device having instructions stored thereon that, when executed by at least one computing device, cause the at least one computing device to perform operations comprising:

receiving a triggering event from a client device;

generating a processing map, wherein the processing map indicates a processing flow between a plurality of processing instances to execute a task associated with the triggering event, the processing flow specifying, for each of a plurality of steps of the task, a respective type of processing to be performed;

generating or selecting a topography map specifying a network topography including the plurality of processing instances, wherein the topography map maps each respective type of processing to a corresponding input point for at least one processing instance that performs the respective type of processing; and outputting the processing map and data associated with the triggering event to multiple processing instances of the plurality of processing instances, wherein each of the multiple processing instances is configured to autonomously perform an identification process upon receiving the processing map and the data associated with the triggering event and having access to a respective locally stored copy of the topography map, and wherein the identification process comprises:

executing a respective step of the task;

reading the processing map to determine a subsequent type of processing for a subsequent step;

identifying, based on the respective locally stored copy of the topography map and based on the subsequent type of processing, a subsequent processing instance by identifying an input point of the subsequent processing instance mapped to the subsequent type of processing in the respective locally stored copy of the topography map; and outputting a result of the respective step to the identified input point of the subsequent processing instance, wherein each of the multiple processing instances continues execution using its respective locally stored copy of the topography map irrespective of availability of the topography map after receipt of the respective locally stored copy of the topography map.

16. The non-transitory computer-readable device of claim 15, the operations further comprising:

generating the topography map by grouping two or more processing instances based on a plurality of factors, wherein each processing instance is configured to execute a processing task and wherein the processing task executed by a first processing instance is different from the processing task executed by a second processing instance.

17. The non-transitory computer-readable device of claim 15, wherein a first processing instance of the plurality of processing instances is mapped to a first topography map and to a second topography map, different from the first topography map.

18. The non-transitory computer-readable device of claim 15, wherein the topography map comprises two or more processing instances configured to execute a same processing task with an order of precedence, and wherein a processing instance is configured to send an output to a highest-precedence available processing instance of the two or more processing instances.

19. The non-transitory computer-readable device of claim 15, the operations further comprising:

updating the topography map; and outputting the updated topography map to processing instances associated with the updated topography map.

20. The non-transitory computer-readable device of claim 15, the operations further comprising:

receiving a request for a topography map update from a processing instance; and in response to a determination that an updated topography map is available, sending the updated topography map to processing instances associated with the updated topography map.

* * * * *